United States Patent
Gustavsson

(10) Patent No.: US 11,185,808 B2
(45) Date of Patent: Nov. 30, 2021

(54) SEPARATOR AND METHOD OF OPERATING A SEPARATOR

(71) Applicant: HUSQVARNA AB, Huskvarna (SE)

(72) Inventor: Daniel Gustavsson, Söderköping (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 16/643,743

(22) PCT Filed: Sep. 5, 2018

(86) PCT No.: PCT/SE2018/050888
§ 371 (c)(1),
(2) Date: Mar. 2, 2020

(87) PCT Pub. No.: WO2019/050456
PCT Pub. Date: Mar. 14, 2019

(65) Prior Publication Data
US 2020/0269179 A1 Aug. 27, 2020

(30) Foreign Application Priority Data

Sep. 5, 2017 (SE) .................... 1751071-0

(51) Int. Cl.
*B01D 46/46* (2006.01)
*B01D 45/12* (2006.01)
(Continued)

(52) U.S. Cl.
CPC ............. *B01D 46/46* (2013.01); *B01D 45/12* (2013.01); *B01D 46/444* (2013.01);
(Continued)

(58) Field of Classification Search
CPC ...... B01D 46/46; B01D 45/12; B01D 46/444; B01D 50/002; B01D 46/446; B24B 7/18;
(Continued)

(56) References Cited

U.S. PATENT DOCUMENTS 4,667,264 A * 5/1987 Yamazaki ............ H02H 11/004
361/77
5,242,474 A * 9/1993 Herbst .................. A61B 18/00
96/397
(Continued)

FOREIGN PATENT DOCUMENTS

CN 101006910 A 8/2007
CN 101801252 A 8/2010
(Continued)

OTHER PUBLICATIONS

Office Action and Search Report for Swedish Application No. 1751071-0 dated Feb. 23, 2018.
(Continued)

*Primary Examiner* — Dung H Bui
(74) *Attorney, Agent, or Firm* — Burr & Forman, LLP

(57) ABSTRACT

The present document discloses a method of operating a separator (1) for separating particles from a particle-laden airflow, wherein the separator comprises a flow path (F), a separation unit (11, 12, 13), arranged in the flow path (F), an impeller (14), arranged in the flow path (F), and an electric motor (15), configured to drive the impeller (14) so as to generate the airflow in the flow path (F). The method comprises initiating a power supply to the electric motor (15), measuring a pressure in the flow path using a pressure sensor (16a, 16b, 16c, 16d), determining a direction of the airflow based on the pressure, and if the direction of the airflow does not correspond to a desired direction of the airflow, then changing a phase sequence of the power supply to the electric motor (15). The document further discloses a separator (1) and a system comprising a separator (1) and a floor grinding machine (2).

12 Claims, 1 Drawing Sheet

(51) Int. Cl.
*B01D 46/44* (2006.01)
*B01D 50/00* (2006.01)
*B24B 7/18* (2006.01)
*B24B 55/10* (2006.01)

(52) U.S. Cl.
CPC ......... *B01D 46/446* (2013.01); *B01D 50/002* (2013.01); *B24B 7/18* (2013.01); *B24B 55/102* (2013.01)

(58) Field of Classification Search
CPC ....... B24B 55/102; B24B 55/06; B24B 55/10; B04C 2009/002; B04C 11/00; B04C 9/00; B04B 13/00; B04B 2013/006; B23Q 11/0046; A47L 7/0095
See application file for complete search history.

(56) References Cited

U.S. PATENT DOCUMENTS

| | | | | |
|---|---|---|---|---|
| 5,271,751 A * | 12/1993 | Lagler | ............... | B01D 50/002 55/295 |
| 5,311,066 A * | 5/1994 | Malloy | ............... | H02J 3/44 307/87 |
| 6,203,859 B1 * | 3/2001 | Scheufler | ............... | B05B 14/43 427/475 |
| 7,611,556 B2 * | 11/2009 | Borinato | ............ | B23Q 11/0046 55/385.1 |
| 8,597,391 B1 * | 12/2013 | Dietz | ............... | B01D 46/2403 55/485 |
| 8,679,236 B1 * | 3/2014 | Dietz | ............... | B01D 46/26 95/287 |
| 10,774,846 B2 * | 9/2020 | Hur | ............... | F04D 29/602 |
| 2004/0087426 A1 * | 5/2004 | Lattanzi | ............... | B04B 5/0421 494/20 |
| 2005/0150199 A1 * | 7/2005 | Michele | ............... | B04C 3/04 55/385.1 |
| 2010/0261595 A1 * | 10/2010 | Schaefer | ............... | B04B 7/08 494/20 |
| 2011/0072782 A1 * | 3/2011 | Ozawa | ............... | B01D 46/46 60/273 |
| 2012/0047856 A1 * | 3/2012 | Khami | ............... | F02M 35/0203 55/385.3 |
| 2012/0260687 A1 * | 10/2012 | Inaniwa | ............... | B04B 9/10 62/196.1 |
| 2014/0209074 A1 * | 7/2014 | Kahle | ............... | F16L 37/088 123/572 |
| 2014/0260994 A1 * | 9/2014 | Grider | ............... | B01D 46/0041 96/399 |
| 2015/0151447 A1 * | 6/2015 | Petersson | ............... | B23B 45/02 30/381 |
| 2015/0157972 A1 * | 6/2015 | Bratten | ............... | B01D 46/003 95/22 |
| 2015/0345439 A1 * | 12/2015 | Gomez | ............... | B01D 50/002 123/184.21 |
| 2018/0045206 A1 * | 2/2018 | Birk | ............... | B01D 46/46 |
| 2018/0140989 A1 * | 5/2018 | Arthur | ............... | B01D 46/10 |
| 2018/0209890 A1 * | 7/2018 | Case | ............... | B01D 46/0086 |
| 2018/0312025 A1 * | 11/2018 | Danielson | ............... | B60G 21/055 |
| 2019/0001250 A1 * | 1/2019 | Moredock | ............... | B01D 46/446 |
| 2019/0117030 A1 * | 4/2019 | Kette | ............... | B01D 46/46 |
| 2019/0225525 A1 * | 7/2019 | Fayerweather | ............... | C03B 5/235 |
| 2020/0256578 A1 * | 8/2020 | Meis | ............... | B01D 46/429 |

FOREIGN PATENT DOCUMENTS

| | | | | |
|---|---|---|---|---|
| CN | 104199442 A | | 12/2014 | |
| CN | 205201232 U | | 5/2016 | |
| DE | 202014102103 U1 | | 6/2015 | |
| EP | 0478966 A2 * | | 4/1992 | ............... H02J 3/38 |
| EP | 0556626 B1 | | 11/1994 | |
| EP | 1136174 A1 | | 9/2001 | |
| EP | 1679156 A1 | | 7/2006 | |
| EP | 1978859 A1 | | 10/2008 | |
| JP | 56133254 U * | | 10/1981 | |
| JP | 2004106163 A | | 4/2004 | |
| WO | 2004075711 A1 | | 9/2004 | |
| WO | 2007080185 A1 | | 7/2007 | |
| WO | 2007083844 A1 | | 7/2007 | |

OTHER PUBLICATIONS

International Search Report and Written Opinion for International Application No. PCT/SE2018/050888 dated Oct. 8, 2018.

* cited by examiner

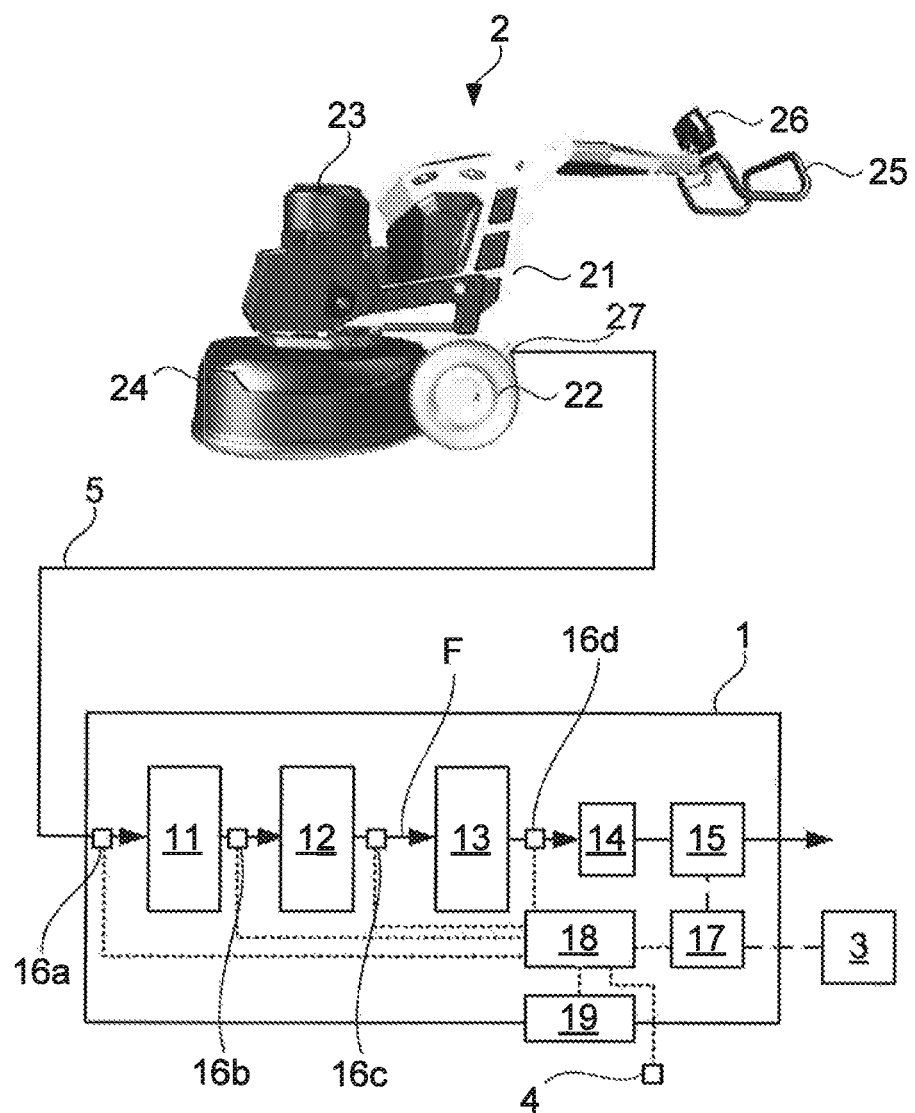

SEPARATOR AND METHOD OF OPERATING A SEPARATOR

TECHNICAL FIELD

The present disclosure relates to a separator for separating particles, such as dust and small debris, from a particle-laden air flow.

Such separators find particular application in construction, renovation and demolition settings, where dust and small debris are generated.

A particular application is the cutting, grinding and/or polishing of floor surfaces of stone or stone-like materials, including concrete and terrazzo floors. A related application is the removal of coatings on floors, such as epoxy, vinyl floorings or glue.

BACKGROUND

A separator typically comprises a drive motor connected to an impeller, which causes an airflow. The airflow is drawn through a separation unit, which may comprise one or more centrifugal separators and/or filters. The drive motor is typically an electric motor.

Since most impellers provide an airflow which is dependent on their direction of rotation, it is important to obtain the correct direction of rotation of the impeller. Some electric motors need to be supplied power with a specific phase sequence in order to rotate in a particular direction.

The phase sequence obtained from an electric power outlet is dependent on how the wires are installed in the power outlet and on how the wires are installed in the power plug providing power to the motor.

Hence, when an electric motor is powered up, its direction of rotation may differ between different sites or between different connections.

In consequence, a separator that is being powered up may draw in air, or it may blow out air, depending on the phase sequence received when it is powered up.

Conventional ways of managing this problem is to measure phase sequence and switch phases if needed, to use a frequency inverter or to use a soft starter with phase sequence fault indication. However, such solutions may be costly to implement.

It is thus desirable to provide a way of controlling a separator that is reliable, yet less costly.

SUMMARY

An object of the present disclosure is to provide an improved way of controlling a separator, as well as a separator thus controllable.

The invention is defined by the appended independent claims, with embodiments being set forth in the attached dependent claims, in the following description and in the attached drawings.

According to a first aspect, there is provided a method of operating a separator for separating particles from a particle-laden airflow. The separator comprises a flow path, a separation unit, arranged in the flow path, an impeller, arranged in the flow path, and an electric motor, configured to drive the impeller so as to generate the airflow in the flow path. The method comprises initiating a power supply to the electric motor, measuring a pressure in the flow path using a pressure sensor, determining a direction of the airflow based on the pressure, and if the direction of the airflow does not correspond to a desired direction of the airflow, then changing a phase sequence of the power supply to the electric motor.

The electric motor may be any electric motor whose direction of rotation is dependent on the phase sequence. An example of such a motor is a 3-phase asynchronous electric motor.

The motor of the separator may be an asynchronous electric motor, which may operate at three phases. Typically, the electric motor may operate at 3-10 kW, preferably 4-8 kW and provide an airflow of about 300-1000 $m^3/h$, preferably 300-700 $m^3/h$.

This method provides a simple and robust way of managing the motor's dependence on phase sequence, since some otherwise costly components can be dispensed with.

Moreover, the pressure sensor may have dual uses, e.g. as part of a system for determining pressure drop over the separation unit.

Measuring a pressure may comprise providing at least two values representing the pressure in the flow path at different points in time, and wherein determining a direction of the airflow comprises comparing the values to determine whether the pressure is increasing or decreasing.

The two values may be on the order of 5-500 ms apart, preferably 5-100 ms apart or 5-20 ms, apart.

It is understood that a series of values may be recorded, with only some of these values being used to determine the pressure. Alternatively, two or more values may be fitted to a pressure function, a derivative of which may be used to indicate the pressure trend.

The method may further comprise measuring an ambient pressure, outside the flow path, and determining a direction of the airflow may comprise comparing the pressure in the flow path with the ambient pressure.

The measuring, determining steps and changing steps may be performed during a startup phase of the electric motor, and preferably during less than an initial 50% of said startup phase, preferably less than 30% of the startup phase.

A startup phase is defined as the time period from initiation of the power supply until the motor has reached at least 99% of a predetermined operating power. Normally, a startup phase may be 3-10 s, typically 4-6 s. Hence, the method disclosed herein may increase the startup phase by 500-1500 ms.

Initiating a power supply to the electric motor may comprise providing said power supply for a time sufficient to measure the pressure change in the flow path, and subsequently turning off the power until the determining step has been concluded.

For example, the motor may be powered during 500-1500 ms, preferably 800-1200 ms, which may be sufficient for a pressure change in the flow path to be detectable, especially in view of the inertia of the movable parts of the motor and the impeller.

A pressure change that is sufficient to decide on the airflow direction may be on the order of 2-5 mbar, typically about 3-4 mbar.

The power may remain turned off for a time sufficient for the motor/impeller to slow down, e.g. for less than 5 s, preferably less than 1 s, less than 500 ms or less than 200 ms. A longer time may be necessitated if the power supply cannot provide a current sufficient to counter the rotation in the opposite direction and/or the pressure.

By starting up the motor with such a relatively short pulse, it is possible to reduce the negative effects of starting it with the wrong direction of rotation. That is, it is the amount of dust-laden air blown out in the reverse direction of the separator is reduced.

Measuring a pressure in the flow path may comprise measuring the pressure upstream of the impeller, relative to a normal vacuum operation of the separator, preferably immediately upstream of the impeller.

By "immediately upstream" is understood that there are no functional components, such as filters, of the separator between the sensor and the impeller.

Measuring a pressure in the flow path may comprise measuring the pressure downstream of the impeller, relative to a normal vacuum operation of the separator.

According to a second aspect, there is provided a separator for separating particles from a particle-laden airflow, comprising a flow path, a separation unit, arranged in the flow path, an impeller, for driving the airflow, arranged in the flow path, an electric motor, configured to drive the impeller so as to generate the airflow in the flow path, and a controller, configured control a power supply to the electric motor. The separator further comprises a phase sequence changer is configured to control a phase sequence of the power supply to the electric motor, a pressure sensor is arranged in the flow path and operatively connected to the controller, the controller is configured to receive a pressure signal, corresponding to the pressure in the flow path, and the controller is configured to control the phase sequence changer based on the pressure signal.

The electric motor may be an asynchronous 3-phase motor.

The separation unit may comprise at least one of a centrifugal separator and a filter device.

An inlet for the particle-laden airflow may be provided with a hose connection.

The hose connection may be any type of hose connector, but preferably of a size exceeding 2 inches, more preferably 3-4 inches.

A standardized hose connector, such as the Camlock standard, may be used.

The same sort of hose connector may be used on the grinding machine. Optionally, the hose connectors of the grinding machine and on the separator may be of the same size but male and female. As another option, the hose connectors on the grinding machine and on the separator may be both male or both female.

According to a third aspect, there is provided a system comprising a separator as described above and a floor grinding machine.

BRIEF DESCRIPTION OF THE DRAWING

FIG. 1 is a schematic diagram illustrating a source of dust 2 and a separator 1.

DETAILED DESCRIPTION

FIG. 1 schematically illustrates separator 1, which is connected to a source of dust, such as a floor grinding machine 2.

The floor grinding machine 2 may comprise a frame 21 having support wheels 22, which may be driven, a motor 23, which is operatively connected to a rotatable grinding head (not shown) carrying a number of grinding tools for cutting, grinding or polishing of a floor surface. The grinding head may be housed in a casing 24, to prevent the dust/debris generated, as well as water that is sometimes supplied to cool tools or bind dust, from escaping to the ambient environment. The grinding machine 2 may further comprise a handle 25 to allow a user to maneuver the machine, and a user interface 26, through which information may be provided to the operator and control signals received from the operator.

A suction opening 27 is provided in the housing 24, through which the floor grinding machine is connected via a channel 5, such as a hose, to a flow path F of the separator 1.

Two or more of each separation unit 11, 12, 13 may be arranged in the flow path F.

Typically, the separator 1 comprises two or more separation units 11, 12, 13, arranged such that the larger particles are separated by the separation unit arranged 11 farthest upstream, and the remaining separation units 12, 13 separating increasingly finer particles from the airflow.

In the illustrated embodiment, the separator comprises a pre-separator 11, which may have the form of a centrifugal separator, a first filter 12, which may comprise a generally cylindrical filter body and a second filter 13, which may comprise a HEPA filter.

An impeller 14 is arranged in the flow path F in order to drive the airflow in the flow path F. An electric motor 15 is connected to the impeller, e.g. by an axle, a belt or a gear arrangement, so as to cause the impeller to rotate. The motor may be powered by an electric power supply 3, which may be a power grid or a generator. The power may be supplied via a power control device 17.

One or more pressure sensors 16a, 16b, 16c, 16d may be arranged in the flow path, to measure pressure.

A controller 18 may be connected to the pressure sensors 16a, 16b, 16c, 16d, to receive sensor signals, to the power control device 17 to control the motor, e.g. with respect to drive voltage, and optionally to receive motor status data, such as current rpm, voltages, power consumption, etc.

The separator 1 may further comprise a communication device 19, which may be integrated with the controller 18, or provided as a separate component.

The communication device 19 may operate based on a wired interface. However, it is preferred if it operates wirelessly, such as via infrared or RF. A standard interface, such as Wi-Fi, Bluetooth or wireless CAN may be used. Alternatively, a custom made wireless interface and protocol may be used.

The separator 1 operates by the motor 15 driving the impeller 14 so as to bring about an airflow in the flow path F. Typically, the motor will be arranged on a low pressure side of the separation units 11, 12, 13.

The power control device 17 may comprise, consist essentially of or consist of, a phase sequence changer, which may be manually operated or it may be controlled by a controller 18, which may be a separate motor controller or a central controller arranged to control the entire separator 1. Such a phase sequence changer may be configured to provide at least two different settings, which differ from each other in that a pair of phases are switched in one of the settings as compared to the other one.

One or more pressure sensors 16a, 16b, 16c, 16d are arranged in the flow path F. The pressure sensor(s) may be arranged on an upstream side of the impeller, and preferably immediately upstream of the impeller, between the impeller and the filter unit that is arranged closest to the impeller, as seen along the flow path F.

Alternatively, the pressure sensor 16a, 16b, 16c, 16d may be positioned at any other position along the flow path, such as between a pair of separation units 11, 12; 12, 13 or even downstream of the impeller.

By applying additional pressure sensors 16a, 16b, 16c, 16d positioned in the flow path F, it is possible to measure a pressure differential over one or more individual separation units 11, 12, 13. Hence, it is possible to determine a pressure drop over one or more separation units.

The pressure sensors 16a, 16b, 16c, 16d are connected to the controller 18, such that the controller may receive a sensor signal indicating a pressure in the flow path.

Optionally, an external sensor 4 may be provided, arranged for measuring an ambient pressure in the area where the separator 1 is operating.

The external sensor 4 may be attached to the separator 1 or to the dust source 2. Alternatively, the external sensor may be separate from the separator 1. For example, it may be a separate pressure sensing unit, which may be handheld, or it may be arranged on another apparatus operating in the vicinity of the separator 1.

The controller 18 may be arranged to receive also a second sensor signal from the external sensor 4.

The sensors 16a, 16b, 16c, 16d, 4 may communicate with the controller by wire or wirelessly. The sensor signals may be provided as analog or digital signals.

The description will now focus on the operation of the separator 1.

At the initiation of the separator's operation, there is a startup phase, at the beginning of which the impeller is stationary and at the end of which the impeller operates at a predetermined operating rpm. Normally, it would take about 5 seconds for the motor to bring the impeller up to operating rpm. It is understood that the operating rpm may be varied, e.g. reduced to save power, or increased to cope with temporarily higher vacuum demand.

During the startup phase, a pressure in the flow path F is measured, and a corresponding signal received by the controller 18.

According to some embodiments, the pressure is measured upstream of the impeller. Hence, for a normal vacuum operation, it is expected that the pressure should begin to drop as soon as the impeller starts generating some airflow.

The pressure drop may be identified as a difference in pressure between separate points in time. The points in time may be on the order of 5-500 ms apart, preferably 5-100 apart or 5-20 ms, apart.

For example, a first point may be when the impeller is stationary, e.g. even before the operation is initiated. A second point may be after the impeller has begun to move. However, for a measurable pressure drop to be achieved, it may be necessary to wait until a certain under pressure or over pressure has been achieved. This may take on the order of 500-1500 milliseconds. For example, a sufficient pressure difference may be on the order of 2-5 mbar, typically about 3-4 mbar.

Alternatively, the pressure drop may be identified relative to an ambient pressure by using the external pressure sensor 4. That is, if the pressure in the flow path F becomes lower than the ambient pressure, normal operation may be assumed.

The power may be applied to the motor for a limited time corresponding to what is necessary to build up the under pressure. Hence, the power may be applied for 500-1500 milliseconds, after which it is turned off, regardless of whether the desired airflow direction has been attained or not.

If it is then determined that the desired airflow direction was attained, the motor can be powered up again.

If, on the other hand, it is determined that the airflow direction was not the desired one, the phase sequence changer will be operated before the power is reapplied. That is, the pressure at the pressure sensor 16a, 16b, 16c, 16d in the flow path begins to increase, i.e. it becomes higher than ambient pressure, or the pressure derivative is positive.

On determining that the airflow direction is not the correct one, an alarm may be issued to the operator, e.g. prompting the operator to take action, such as by modifying the power supply, or by activating the phase sequence changer 17.

Alternatively, the controller 18 may control the phase sequence changer 17 to switch two of the phases of the power supplied to the electric motor 15.

The power may remain turned off for a time sufficient for the motor/impeller to slow down, e.g. for less than 5 s, preferably less than 1 s, less than 500 ms or less than 200 ms. A longer time may be necessitated if the power supply cannot provide a current sufficient to counter the rotation in the opposite direction and/or the pressure.

Thereafter, the power may be reapplied, such that operation of the separator 1 can resume, now with the correct direction of rotation and direction of airflow.

It is understood that the sensors 16a, 16b, 16c, 16d, 4 can be absolute pressure sensors, configured to measure an absolute pressure at each point, while such absolute pressures may then be either evaluated over time or compared with each other, as described above.

As an alternative, it is possible to use differential pressure measurements, e.g. by comparison between e.g. one sensor arranged in the flow path and another one arranged outside the flow path, or by comparison between sensors arranged on different sides of a separation unit 11, 12, 13.

The invention claimed is:

1. A method of operating a separator for separating particles, such as dust and small debris, from a particle-laden airflow, the separator comprising:
   a flow path,
   a separation unit, arranged in the flow path,
   an impeller, arranged in the flow path, and
   an electric motor, configured to drive the impeller so as to generate airflow in the flow path,
   the method comprising:
   initiating a power supply to the electric motor,
   measuring a pressure in the flow path using a pressure sensor,
   determining a direction of the airflow based on the pressure, and
   if the direction of the airflow does not correspond to a desired direction of the airflow, then changing a phase sequence of the power supply to the electric motor.

2. The method as claimed in claim 1, wherein measuring a pressure comprises providing at least two values representing the pressure in the flow path at different points in time, and wherein determining a direction of the airflow comprises comparing the values to determine whether the pressure is increasing or decreasing.

3. The method as claimed in claim 1, further comprising measuring an ambient pressure, outside the flow path, and wherein determining a direction of the airflow comprises comparing the pressure in the flow path with the ambient pressure.

4. The method as claimed in claim 1, wherein said measuring, determining steps and changing steps are performed during a startup phase of the electric motor, and during less than an initial 50% of said startup phase.

5. The method as claimed in claim 1, wherein initiating a power supply to the electric motor comprises providing said power supply for a time sufficient to measure the pressure change in the flow path, and subsequently turning off the power until the determining step has been concluded.

6. The method as claimed in claim 1, wherein measuring a pressure in the flow path comprises measuring the pressure upstream of the impeller, relative to a normal vacuum operation of the separator.

7. The method as claimed in claim 1, wherein measuring a pressure in the flow path comprises measuring the pressure downstream of the impeller, relative to a normal vacuum operation of the separator.

8. A separator for separating particles from a particle-laden airflow, comprising:
 a flow path,
 a separation unit arranged in the flow path,
 an impeller, for driving the airflow, arranged in the flow path,
 an electric motor configured to drive the impeller so as to generate the airflow in the flow path, and
 a controller configured control a power supply to the electric motor,
 wherein a phase sequence changer is configured to control a phase sequence of the power supply to the electric motor,
 wherein a pressure sensor is arranged in the flow path and operatively connected to the controller,
 wherein the controller is configured to receive a pressure signal, corresponding to the pressure in the flow path, and
 wherein the controller is configured to control the phase sequence changer based on the pressure signal.

9. The separator as claimed in claim 8, wherein the electric motor is an asynchronous 3-phase motor.

10. The separator as claimed in claim 8, wherein the separation unit comprises at least one of a centrifugal separator and a filter device.

11. The separator as claimed in claim 8, wherein an inlet for the particle-laden airflow is provided with a hose connection.

12. A system comprising a separator as claimed in claim 8 and a floor grinding machine.

\* \* \* \* \*